Nov. 11, 1952 F. GRAY 2,617,980

CODER FOR PULSE CODE MODULATION SYSTEMS

Filed Nov. 16, 1949 3 Sheets-Sheet 1

INVENTOR
F. GRAY
BY Hugh S. Wertz
ATTORNEY

Nov. 11, 1952 F. GRAY 2,617,980

CODER FOR PULSE CODE MODULATION SYSTEMS

Filed Nov. 16, 1949 3 Sheets-Sheet 2

INVENTOR
F. GRAY
BY Hugh S. Wertz
ATTORNEY

CODER FOR PULSE CODE MODULATION SYSTEMS

Filed Nov. 16, 1949 3 Sheets-Sheet 3

INVENTOR
F. GRAY
BY Hugh S. Wertz
ATTORNEY

Patented Nov. 11, 1952 2,617,980

UNITED STATES PATENT OFFICE 2,617,980

CODER FOR PULSE CODE MODULATION SYSTEMS

Frank Gray, East Orange, N. J., assignor to Bell Telephone Laboratories, Incorporated, New York, N. Y., a corporation of New York Application November 16, 1949, Serial No. 127,739

15 Claims. (Cl. 332—11)

This invention relates to coding circuits and, more specifically, to such circuits for use in pulse code modulation systems.

In communication by the method known as pulse code modulation, a message wave to be transmitted is sampled periodically and the amplitude of each sample is represented for transmission by a code analogous to telegraph codes. Generally, such codes are based on the permutation of a fixed number of elements $n$, each of which may have any of $m$ values to provide $m^n$ unique code combinations. For the purpose of transmission by pulse code modulation, each of the $n$ code elements may be represented by a pulse which may have any of $m$ different amplitudes.

One permutation code which has been used in pulse code modulation systems is based upon the binary system of numeration. Each of the $n$ code elements then has either of two values and the total number of permutations is equal to $2^n$. The required two values are most conveniently represented for transmission by bivalued pulses, usually "on" or "off" pulses, although pulses of two different finite amplitudes are occasionally employed.

Since the signal to be transmitted may be continuously variable and the total number of permutations available in any code is limited, only a quantized replica of the message signal can be transmitted. Thus the total amplitude range available for the signal is divided into a finite number of constituent amplitude ranges, each corresponding to one of the permutations available in the code employed. The message signal samples are then compared with the quantized amplitude range to determine which of the quantized amplitudes most nearly represents the sample and the code group representing that quantized amplitude is transmitted.

Various circuits have been devised for producing pulse code groups representing the amplitudes of applied message samples. One such technique is that disclosed by R. W. Sears in the Bell System Technical Journal, vol. 27, page 44 et seq., January 1948, employing a cathode-ray tube in which the magnitude of the signals or complex wave to be transmitted is utilized to deflect the electron beam in one direction by an amount which is a function of or under the control of the amplitude of the complex wave to be transmitted.

This electron beam deflection tube, together with associated beam positioning and sweep circuits, performs the code modulation rapidly, making possible the sequential modulation of a number of channels in time division multiplex, but its structure is both delicate and complex, requiring a series of precisely spaced quantizing grid wires and a plate with a complicated pattern of critically positioned apertures.

It is an object of the present invention to retain the advantages of the electron beam coder, while effecting a substantial simplification in coding tube structure.

It is also an object of the present invention to provide for the use of a greatly increased number of amplitude steps all within the limitations of practical electron beam tube construction.

In an exemplary embodiment of the invention, the output of a coding device is repeatedly fed back into its input, the number of feedback operations corresponding to the number of code element pulses of the particular code and the character of each code element pulse being determined by the input for each operation. This coding device or "operator" is a cathode-ray tube with a mask so apertured that the output produced by the cathode beam impinging on a target beyond the mask is related to the beam deflecting input in accordance with a desired mathematical function. The basic function employed in the practice of the invention is herein designated the F-function and is such that when the input is less than one-half the maximum amplitude range of the system the output is twice the input, and when the input is greater than half the maximum amplitude range the output is twice the input minus the maximum amplitude of the system. An important extension of this basic function, disclosed in my copending application, Serial No. 127,740, filed October 26, 1949, and therein designated as the P-function, is such that when the input is less than one-half the maximum amplitude range of the system the output is equal to the input, and when the input is greater than half the maximum amplitude range the output is equal to the input minus the maximum amplitude. For each operation in both the F- and P-type systems, the character of the code element pulses is determined by whether the corresponding input is less than or greater than one-half the maximum amplitude.

These coding functions, as well as the several coding devices themselves and the circuits associated therewith which can be used in the practice of the invention, will be more fully understood from the following description and the accompanying drawings forming a part thereof, in which.

Figure 1:
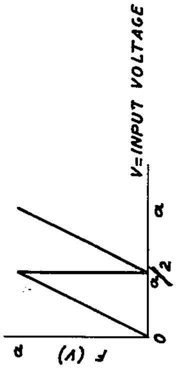
Fig. 1 is a plot of the function F(V) versus V.

In accordance with the invention, a coder or "operator" can be used which directly provides the desired mathematical coding function for a binary code character, and Fig. 1 shows the characteristics of such an operator, which is herein designated as an "F-type operator." The operator output voltage F(V) is plotted as the ordinate versus the operator input voltage V as the abscissa, with the output as well as the input voltage limits lying between zero and the value $a$, the maximum amplitude range of the system. Between the operator input values of $V=0$ and $$V=\frac{a}{2}$$

the output equals 2V, so that throughout this input range the plot of the function F(V) is linear and has a slope of 2. In the interval from $$V=\frac{a}{2}$$

to $V=a$, the plot of the function F(V) is linear and parallel to that of the first-mentioned interval, so that the operator output F(V) becomes $2V-a$ for values of input greater than $a/2$. Only when the operator input is greater than $a/2$ is a code voltage produced, which, when limited to a time interval, appears as a code pulse. When the operator output is applied to its input in the next succeeding time interval, the new input is either 2V or $2V-a$, as the case may be. This new input voltage is designated as $V_1$. The operator output voltage then changes to a new value $2V_1$ or $2V_1-a$, dependent upon whether the value $V_1$ of the new input lies between zero and $a/2$ or between $a/2$ and $a$, and a code pulse is produced in this second time interval only when the new input is greater than $a/2$. The new output is also fed back to the operator input in the next time interval to give a third input voltage $V_2$ which is equal to either $2V_1$ or $2V_1-a$, and this input voltage determines the pulse in the third time interval. The process continues to be repeated until the desired number of digits to form the code character has been obtained. Thus, the number of omissions or inclusions of pulses in the code character identifying a signal voltage value is controlled by the number of times the operator output is fed back to its input and by the magnitude of the successive operator input voltages.

Figure 2:
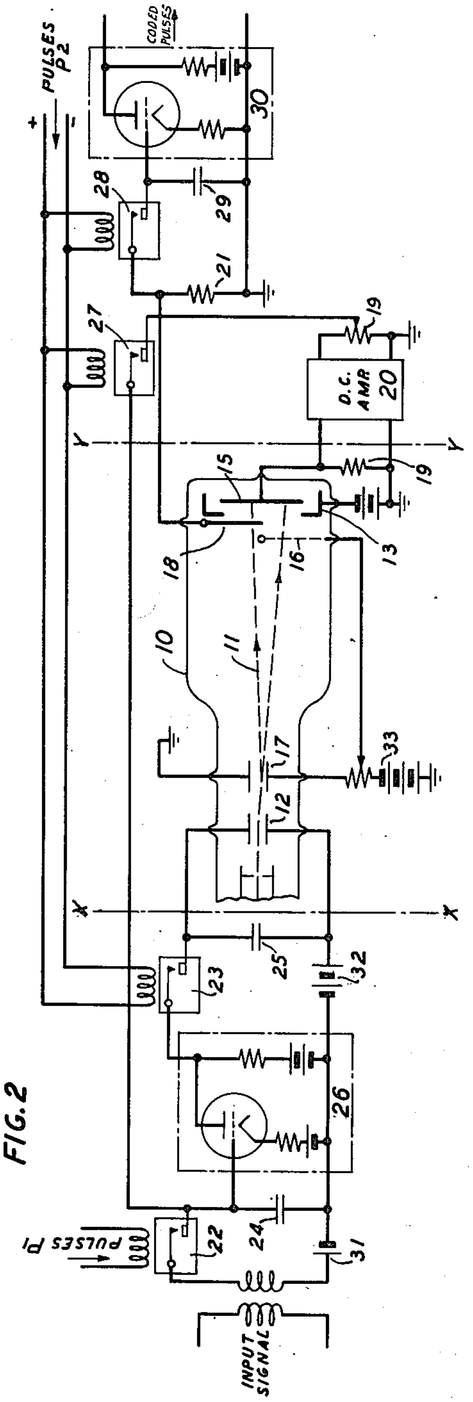
Fig. 2 shows in schematic form an exemplary embodiment of an unbalanced version of the so-called F-type coding circuit in which a beam of ribbon cross-section is used in the coding tube.

Fig. 2 shows one example of an F-type operator 10 and associated circuits and timing pulses which combine to perform the coding operations. The particular operator of the illustration is an electron beam tube which provides an electron beam 11 of ribbon-like cross-section. This beam, deflected by the operator input voltage which is applied to the sweep plates 12, impinges on the mask 13, which has two triangular apertures 14 and 114, as shown in the end view of the mask in Fig. 5. The voltage drop across resistor 19 due to the electron current passing through these apertures to the output electrode 15 thus varies in the required saw-tooth manner as a function of the input beam deflecting voltage, as shown in the plot of this F-function in Fig. 1. A bias voltage is applied between the mask 13 and the output electrode 15 to avoid secondary electron currents. The operator output voltage appearing across the resistor 19 may require an amplifier 20 to furnish feedback at the proper level. The code pulses are produced when the electron beam falls on electrode 18, i. e., when the beam is swept over the upper half of the mask shown in Fig. 5, and produces a voltage drop across resistor 21.

The beam has a finite width, which tends to cause an ambiguous output when the beam is on the division line between the two apertures and passing through both of them. To obviate such ambiguity a fine wire 16 is located in front of the division line to furnish feedback to a pair of auxiliary sweep plates 17, this feedback preventing the beam from being exactly on the division line at any time. This feature is well known in the electronic art and should not be confused with the proposed feedback employed to perform the coding operation.

Figure 4:
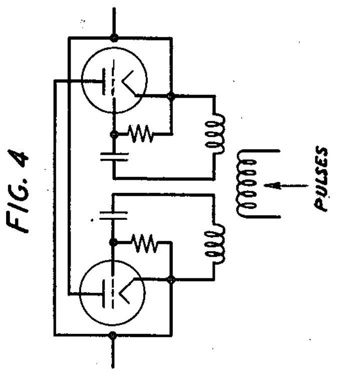
Fig. 4 is a schematic circuit diagram of an electronic clamp of a type which can be used in the practice of the invention in all its embodiments.
Figure 3:
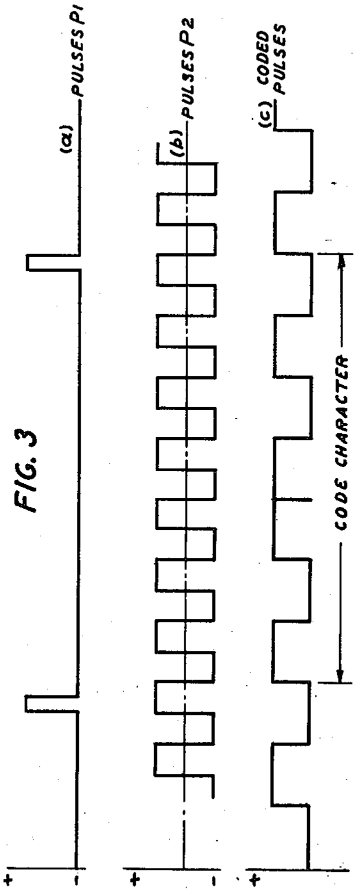
Fig. 3 illustrates the timing pulses employed in the practice of the specific embodiment of the invention shown in Fig. 2 and the coded pulses produced thereby.

The elements numbered 22, 23, 27 and 28 are electronic clamps, and a schematic circuit diagram of one type of clamp which can be used in the practice of the invention is shown in Fig. 4. A complete description of the operation of clamping or "sampling" circuits in general may be found in the M. I. T. Radiation Laboratory Series, vol. 19, section 10.3, pages 370 to 381, and the circuit of Fig. 4 is there shown and described as Fig. 10.12 at page 376. In that circuit, the plate-cathode paths of the two triodes are connected directly in parallel, conducting in opposite directions. The grids are both arranged to be biased below cut-off during the "open" condition of the sampler by grid rectification of pulses, and to be driven strongly positive by a pulse when a low resistance conducting path is required between source and load. A timing pulse applied to a clamp can close it for a time interval and it can then pass current in either direction, but it remains open at all other times. The clamps 23, 27 and 28 are operated from a common alternating-current pulse supply $P_2$ which is applied to them in opposite phases so that clamp 23 is open when clamps 27 and 28 are closed and vice versa. In addition, clamp 22 is operated from a pulse supply $P_1$. The nature of timing pulses $P_1$ and $P_2$ is shown in Fig. 3, and it will be seen that the following sequence of operations occurs:

Assume that an input signal constituting a complex wave, such as speech, for example, is applied at the left in Fig. 2. Clamp 22 is closed by a pulse $P_1$ (see Fig. 3, line *a*) to begin a code character and capacitor 24 is charged to the voltage that is to be coded. At the same time clamp 23 is closed by a pulse $P_2$ (see Fig. 3, line *b*) so that capacitor 25 in the input circuit of the operator 10 is charged to this same voltage, which thereby appears on sweep plates 12 and deflects the electron beam 11. Clamp 22 then opens and remains open until the code character is completed. Clamp 23 also opens and clamp 27 closes, so that the voltage drop across the output resistor 19 amplified by amplifier 20 is fed back to capacitor 24. Clamps 23 and 27 then continue to close alternately and each successive output is fed back into the input until the code character of the desired number of digits is completed. The gain of the amplifier 20 is adjusted so that any voltage fed back is F(V) of the input voltage V on capacitor 25.

The sweep plates 12 are kept from floating during the switching operation by the capacitor 25, which is permitted by the tube 26 to be brought to the voltage across capacitor 24 without depleting the charge on the latter.

Clamp 28 closes simultaneously with the closing of clamp 27, so that if the beam rests on the code electrode 18 the voltage across resistor 21 is clamped on capacitor 29. This capacitor is connected to the grid of a cathode follower 30, and each code pulse from the follower thus has a time length equal to a pulse period, which is considered a desirable feature in pulse code modulation transmission. The circuit thus carries out the sequence of operations described for the F-type coding function of Fig. 1 and produces a binary code of a signal sample (see Fig. 3, line *a*).

Also in accordance with the invention, alternate embodiments of the F-type operator are provided in which the electron beam has a spot cross-section rather than a ribbon. The electron beam with a ribbon cross-section can be replaced by a beam with a spot cross-section by applying an additional high frequency voltage to sweep plates 12 or 17 to oscillate the beam rapidly back and forth along a straight line, and thus cause it to have an effective ribbon-like cross-section, or an additional pair of sweep plates can be included in the tube for this purpose. In this method of operation, the additional sweep voltage must have a high frequency in comparison with the code pulse frequency, and in high-speed coding circuits this may demand an inconveniently high frequency sweep. In such cases, the following alternative form of the F-type operator permits a beam 35 with a spot cross-section to be used with a sweep frequency equal to the code pulse frequency.

Figures 5, 6, 7:
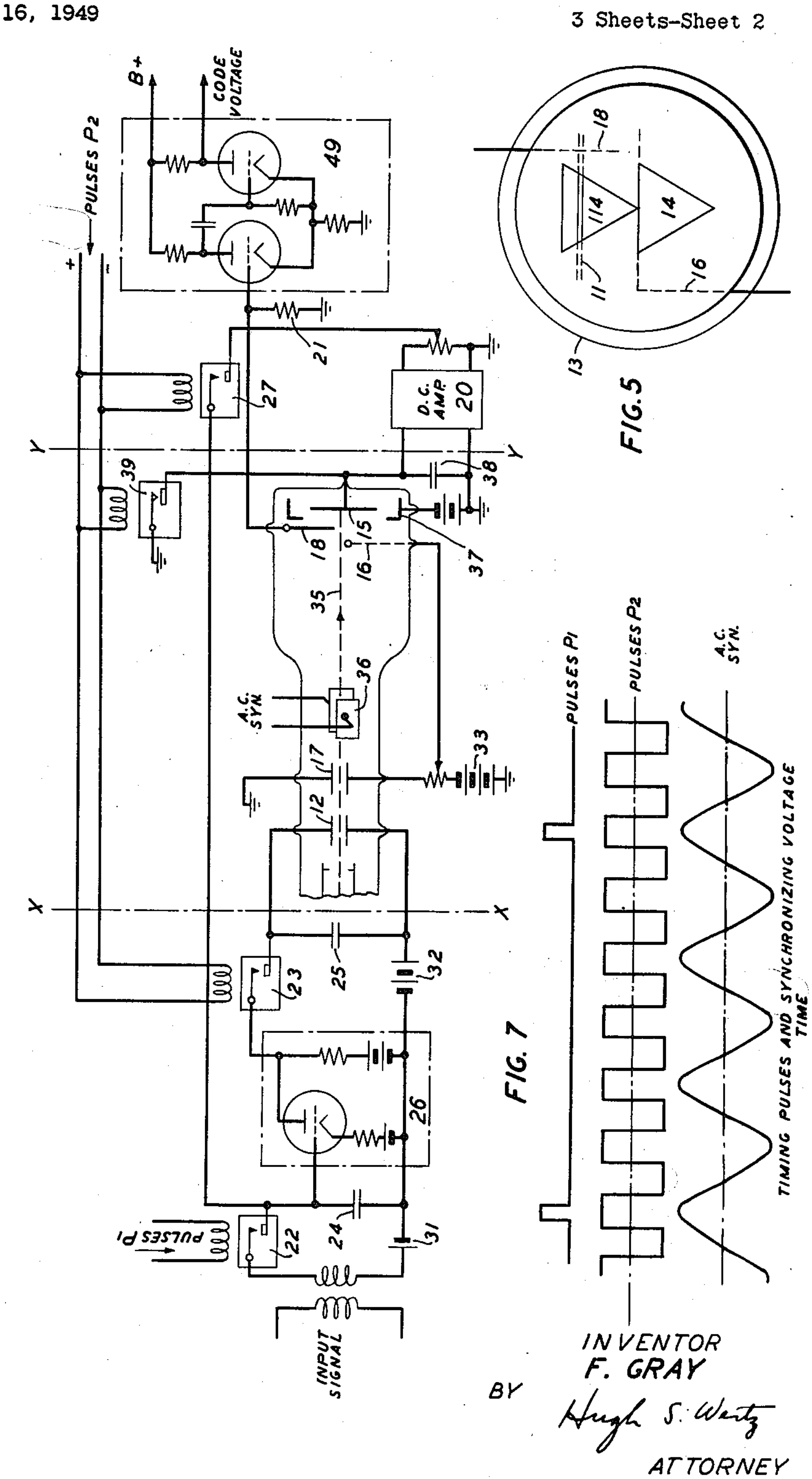
Fig. 5 is a view of a coding tube mask which can be used to provide the F-type operator characteristics in a circuit such as that shown in Fig. 2.
Fig. 6 illustrates another embodiment of the invention, differing from that shown in Fig. 2 in that a beam of spot cross-section is used in the coding tube.
Fig. 7 illustrates the timing pulses and the synchronizing voltage employed in the practice of the specific embodiment of the invention shown in Fig. 6.

This alternative embodiment of the invention is shown in Fig. 6 and is identical with that shown in Fig. 2 except for the circuit portion between the lines X—X and Y—Y (i. e., the "operator") and except that in this arrangement a different pulse code output circuit is employed, for reasons discussed below. Synchronized with the timing pulses, shown in Fig. 7, is an alternating-current synchronizing voltage wave (also shown in Fig. 7) which is applied to sweep plates 36 to oscillate the electron beam 35 transversely across the apertures in the mask 37 in synchronism with the timing pulses. These apertures are shown in the end view of the mask (Fig. 8) as split apertures 391, 392, 393 and 394, with the code pulse electrode 18 in the center. Two apertures, with electrode 18 as shown in Fig. 5, can also be used.

The input voltage, as in the already described embodiment, is applied to sweep plates 12 and it deflects the beam in the longitudinal direction along the apertures. The total electron charge passing through the apertures to the output electrode 15 during a half period of oscillation of the synchronizing sweep thus varies the voltage on capacitor 38 as F(V) with respect to the input voltage V, as shown in Fig. 1. But capacitor 38 must be discharged after each operation to prepare it for receiving the next succeeding output charge, and for this purpose it is discharged through an additional clamp 39, which closes for a brief period after each feedback has been completed through clamp 27.

Since sinusoidal alternating current is used to synchronize the beam tube, the shape of the wedge-like apertures is not exactly triangular, but one of the boundaries, i. e., the side which in a triangle would be the hypotenuse, is slightly curved. It can be shown that the equation for the desired shape of such an aperture is $$Y = L \sin\left(nx + \sin^{-1}\frac{S}{L}\right)$$

where Y is the width of an aperture at a distance X from its apex, S is the half width of the separation between adjacent apertures, L is the distance traversed by the beam on the mask, and *n* is an arbitrary constant. Of course, the tube can, alternatively, be synchronized with saw-toothed alternating current, and in that case the apertures can be truly triangular in shape.

Figures 8, 9, 10, 11:
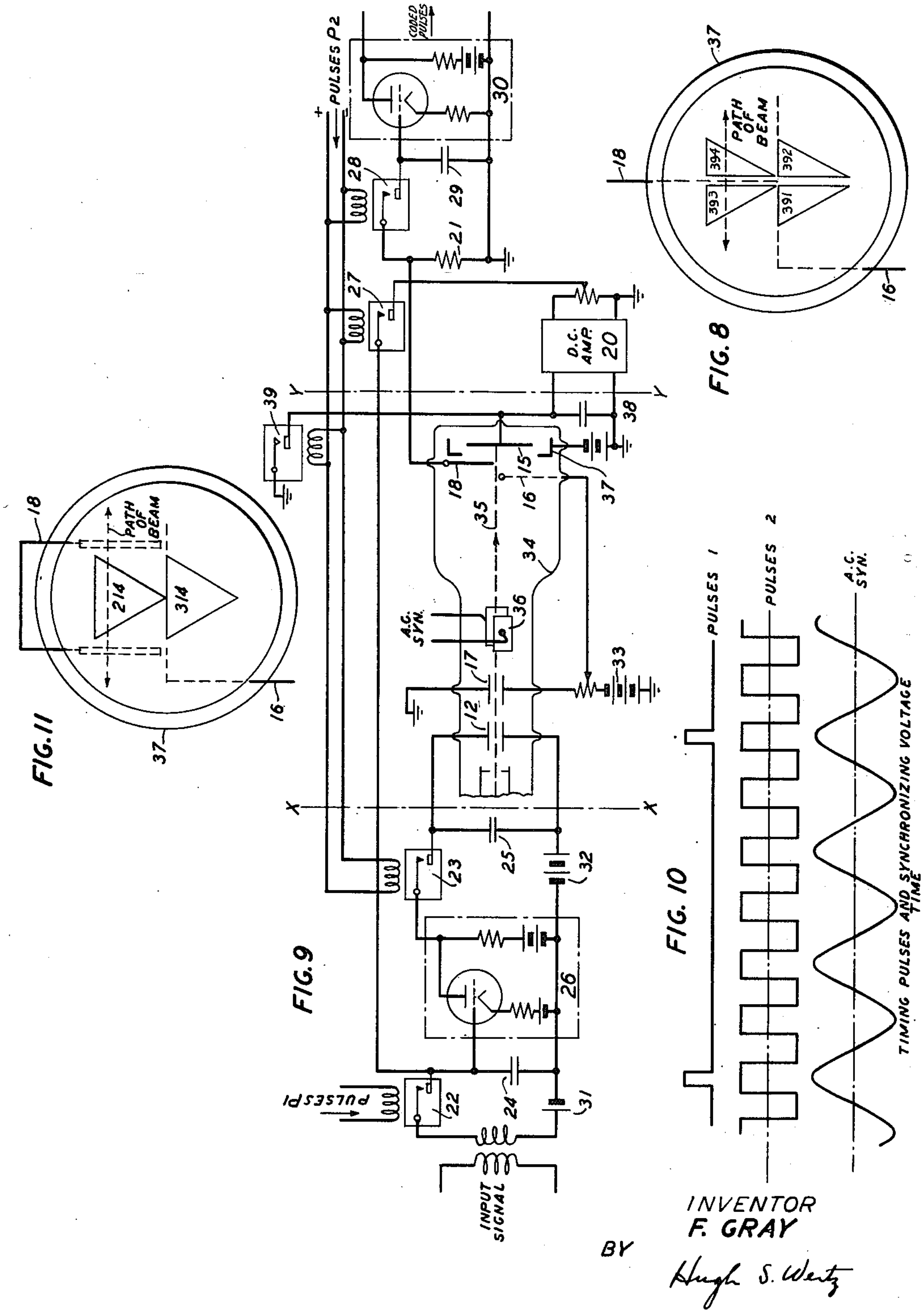
Fig. 8 is a view of a coding tube mask which may be used to provide the F-type operator characteristics in a circuit such as that shown in Fig. 6.
Fig. 9 illustrates an alternative arrangement of the circuit shown in Fig. 6, in which a coding tube of different structure is employed.
Fig. 10 shows the relation between the timing pulses and the synchronizing voltage employed in the practice of the specific embodiment of the invention shown in Fig. 6.
Fig. 11 is an end view of a coding tube mask which may be used to provide the F-type operator characteristics in a circuit such as that shown in Fig. 9.

The code pulses generated by the electron beam's crossing electrode 18, positioned as shown in Fig. 8, will be of short duration. In accordance with the invention, a "single-shot" multivibrator 49 can therefore be used to lengthen each code pulse, making its duration equal to a pulse period. The single-trip multivibrator provides the code pulse only when the operator yields a code output voltage across resistor 21, and the duration of the code pulse is controlled by the time constants of the multivibrator. This arrangement and its operation are depicted in Figs. 6 and 7, but the code voltage output appearing across resistor 21 can be treated in the same manner (shown in Fig. 9) as the ribbon beam code voltage (Fig. 2) if electrode 18 is constructed in two parts, as illustrated in Fig. 11. Code pulses are then provided during the peak intervals of the synchronizing voltage, clamps 28 and 23 being closed simultaneously by timing pulses $P_2$ (of Fig. 10). The beam can cross the coding electrode only once in transit during the half cycle of the sweep wave, and this must occur when clamp 23 is closed to apply the feedback to the capacitor 24, and thus clamp 28 must also then be closed in order to yield a code pulse. Using this two-part construction of electrode 18, apertures 391, 392, 393 and 394 need be only two apertures 214 and 314 (two isosceles triangles, as in the ribbon-beam version of Fig. 2) instead of four.

For simplicity, the coding circuits (both spot and ribbon) have been shown only in unbalanced form. In accordance with the invention, they can, however, be balanced, and this can be done in the manner disclosed in the aforementioned copending application for the so-called P-type operator. It is to be understood, of course, that all of the embodiments of the F-type coder in both balanced and unbalanced forms are equally within the practice of the invention.

In this regard, it is worthy of notice that in the unbalanced form of the F-type operator, as shown in Fig. 2, for example, direct-current biases 31, 32 and 33 are required for the input signal voltage so that zero signal is represented by $$+\frac{a}{2}$$

and the electron beam is centered on the mask.

It is to be understood that the above-described arrangements are illustrative of the application of the principles of the invention. Numerous other arrangements may be devised by those skilled in the art without departing from the spirit and scope of the invention.

What is claimed is:

1. A method for representing samples of a message wave by permutation code groups of $n$ bivalued pulses, $n$ being any positive integer, covering an amplitude range $a$ in $2^n$ steps, which comprises sampling the message wave, operating on said sample to produce an output signal of amplitude equal to double the sample signal amplitude when said sample signal amplitude is less than one-half $a$ and of an amplitude equal to double the signal sample amplitude minus $a$ when said signal sample amplitude is greater than one-half $a$, operating on each output signal thus produced to produce a further output signal of an amplitude equal to double the original amplitude when said original amplitude is less than one-half $a$ and of an amplitude equal to double the original amplitude minus $a$ when said original amplitude is greater than one-half $a$ and repeating this operation until $n$ such operations have been performed on each signal wave sample, and producing a signal pulse of one of said values for each signal of amplitude less than one-half $a$ and producing a pulse of the other of said values for each signal of amplitude greater than one-half $a$.

2. In a system for representing samples of a message wave by permutation code groups of $n$ bivalued pulses, $n$ being any positive integer, covering an amplitude range $a$ in $2^n$ steps, means for sampling the message wave, a coder element having input and output terminals and adapted to produce an output double the input for all inputs less than one-half $a$ and an output equal to double the input minus $a$ for all inputs greater than one-half $a$ and including means for producing a signal pulse of one of the two values for all inputs less than one-half $a$ and a signal pulse of the other of said two values for all inputs greater than one-half $a$, means for applying the message wave sample to the input terminals of said coder element for the production of the first code element pulse, and means for applying the output of said coder element resulting from the production of each code element pulse to the input of said coder element for the production of the next code element pulse.

3. In a system for representing samples of a message wave by permutation code groups of $n$ bivalued pulses, $n$ being any positive integer, covering an amplitude range $a$ in $2^n$ steps, means for sampling the message wave, a coder circuit comprising a closed loop circuit and terminals for injecting a signal into said loop circuit, said loop circuit including a cathode-ray tube which comprises means for producing an electron beam, beam deflecting plates, a mask, and a collector target beyond said mask, the electrical transmitting characteristics of said mask so varying over its area that the output produced by an electron beam transmitted therethrough and impinging on said target contributes to a transmission characteristic of said loop circuit such that for each transversal thereof a signal originally appearing at said terminals will reappear thereat with an amplitude equal to double its original amplitude when said original amplitude is less than one-half $a$ and with an amplitude equal to double its original amplitude minus $a$ when said original amplitude is greater than one-half $a$, means for applying each message wave sample to said terminals, means for causing $n$ transversals of said loop circuit for each message wave sample, and means associated with said loop circuit for producing a signal pulse of one of said values for each signal at said terminals of an amplitude less than one-half $a$ and for producing a pulse of the other of said values for each signal at said terminals of amplitude greater than one-half $a$.

4. In a system for representing samples of a message wave by permutation code groups of $n$ bivalued pulses, $n$ being any positive integer, covering an amplitude range $a$ in $2^n$ steps, means for sampling the message wave, a coder circuit comprising a closed loop circuit and terminals for injecting a signal into said loop circuit, said loop circuit including a cathode-ray tube which comprises means for producing an electron beam, beam deflecting plates, a mask, and a collector target beyond said mask, said mask being so apertured that the output produced by an electron beam impinging on said target contributes to a transmission characteristic of said loop circuit such that for each transversal thereof a signal originally appearing at said terminals will reappear thereat with an amplitude equal to double its original amplitude when said original amplitude is less than one-half $a$ and with an amplitude equal to double its original amplitude minus $a$ when said original amplitude is greater than one-half $a$, means for applying each message wave sample to said terminals, means for causing $n$ transversals of said loop circuit for each message wave sample, and means associated with said loop circuit for producing a signal pulse of one of said values for each signal at said terminals of amplitude less than one-half $a$ and for producing a pulse of the other of said values for each signal at said terminals of amplitude greater than one-half $a$.

5. A cathode-ray tube comprising means for producing an electron beam of ribbon cross-section, beam deflecting plates, means for applying an input signal to said beam deflecting plates, an apertured mask, and a collector target beyond said mask, the aperture of said mask having a shape which permits an electron beam to travel therethrough and impinge on said target to produce an output proportional to double the amplitude of the input to said deflecting plates when said input amplitude is less than one-half the maximum amplitude range and with an amplitude proportional to double the input amplitude minus said maximum amplitude range when said input amplitude is greater than one-half said maximum amplitude range.

6. A cathode-ray tube comprising means for producing an electron beam of spot cross-section, beam deflecting plates, means for applying an input signal to said beam deflecting plates, an apertured mask, and a collector target beyond said mask, the aperture of said mask having a shape which permits an electron beam to travel therethrough and impinge on said target to produce an output proportional to double the amplitude of the input to said deflecting plates when said input amplitude is less than one-half the maximum amplitude range and with an amplitude proportional to double the input amplitude minus said maximum amplitude range when said input amplitude is greater than one-half said maximum amplitude range.

7. In a system for representing samples of a message wave by permutation code groups of $n$ bivalued pulses covering an amplitude range $a$ in $2^n$ steps, means for sampling the message wave, a coder circuit comprising a closed loop circuit and terminals for injecting a signal into said loop circuit, said loop circuit including a cathode-ray tube which comprises means for producing an electron beam, beam deflecting plates, a mask, and a collector target beyond said mask, said mask being so apertured that the output produced by an electron beam impinging on said target contributes to a transmission characteristic of said loop circuit such that for each transversal thereof a signal originally appearing at said terminals will reappear thereat with an amplitude equal to double its original amplitude when said original amplitude is less than one-half $a$ and with an amplitude equal to double its original amplitude minus $a$ when said original amplitude is greater than one-half $a$, means for applying each message wave sample to said terminals, means for causing $n$ transversals of said loop circuit for each message wave sample, and means associated with said loop circuit for producing a signal pulse of one of said values for each signal at said terminals of amplitude less than one-half $a$ and for producing a pulse of the other of said values for each signal at said terminals of amplitude greater than one-half $a$, said means for producing a signal pulse including an electrode which is adapted to produce a signal when impinged upon by a stream of electrons.

8. In a system for representing samples of a message wave by permutation code groups of $n$ bivalued pulses covering an amplitude range $a$ in $2^n$ steps, means for sampling the message wave, a coder circuit comprising a closed loop circuit and terminals for injecting a signal into said loop circuit, said loop circuit including a cathode-ray tube which comprises means for producing an electron beam, beam deflecting plates, a mask, and a collector target beyond said mask, said mask being so apertured that the output produced by an electron beam impinging on said target contributes to a transmission characteristic of said loop circuit such that for each transversal thereof a signal originally appearing at said terminals will reappear thereat with an amplitude equal to double its original amplitude when said original amplitude is less than one-half $a$ and with an amplitude equal to double its original amplitude minus $a$ when said original amplitude is greater than one-half $a$, means for applying each message wave sample to said terminals, means for causing $n$ transversals of said loop circuit for each message wave sample, and means associated with said loop circuit for producing a signal pulse of one of said values for each signal at said terminals of amplitude less than one-half $a$ and for producing a pulse of the other of said values for each signal at said terminals of amplitude greater than one-half $a$, said means for producing a signal pulse including an electrode which is adapted to produce a signal when impinged upon by a stream of electrons, said electrode being so positioned as to be in the path of the deflected electron beam only when the beam has been deflected by a signal sample of amplitude greater than one-half the amplitude range covered by the system.

9. In a system for representing samples of a message wave by permutation code groups of $n$ bivalued pulses covering an amplitude range $a$ in $2^n$ steps, means for sampling the message wave, a coder circuit comprising a closed loop circuit and terminals for injecting a signal into said loop circuit, said loop circuit including a cathode-ray tube which comprises means for producing an electron beam, beam deflecting plates, a mask, and a collector target beyond said mask, said mask being so apertured that the output produced by an electron beam impinging on said target contributes to a transmission characteristic of said loop circuit such that for each transversal thereof a signal originally appearing at said terminals will reappear thereat with an amplitude equal to double its original amplitude when said original amplitude is less than one-half $a$ and with an amplitude equal to double its original amplitude minus $a$ when said original amplitude is greater than one-half $a$, means for applying each message wave sample to said terminals, means for causing $n$ transversals of said loop circuit for each message wave sample, and means associated with said loop circuit for producing a signal pulse of one of said values for each signal at said terminals of amplitude less than one-half $a$ and for producing a pulse of the other of said values for each signal at said terminals of amplitude greater than one-half $a$, said means for producing a signal pulse including a plurality of electrodes which are adapted to produce signals when impinged upon by a stream of electrons.

10. In a system for representing samples of a message wave by permutation code groups of $n$ bivalued pulses covering an amplitude range $a$ in $2^n$ steps, means for sampling the message wave, a coder circuit comprising a closed loop circuit and terminals for injecting a signal into said loop circuit, said loop circuit including a cathode-ray tube which comprises means for producing an electron beam, beam deflecting plates, a mask, and a collector target beyond said mask, said mask being so apertured that the output produced by an electron beam impinging on said target contributes to a transmission characteristic of said loop circuit such that for each transversal thereof a signal originally appearing at said terminals will reappear thereat with an amplitude equal to double its original amplitude when said original amplitude is less than one-half $a$ and with an amplitude equal to double its original amplitude minus $a$ when said original amplitude is greater than one-half $a$, means for applying each message wave sample to said terminals, means for causing $n$ transversals of said loop circuit for each message wave sample, and means associated with said loop circuit for producing a signal pulse of one of said values for each signal at said terminals of amplitude less than one-half $a$ and for producing a pulse of the other of said values for each signal at said terminals of amplitude greater than one-half $a$, said means for producing a signal pulse including a plurality of electrodes which are adapted to produce signals when impinged upon by a stream of electrons, said electrodes being so positioned as to be in the path of the deflected electron beam only when the beam has been deflected by a signal sample of amplitude greater than one-half the amplitude range covered by the system.

11. In a system for representing samples of a message wave by permutation code groups of $n$ bivalued pulses, $n$ being any positive integer, covering an amplitude range $a$ in $2^n$ steps, means for sampling the message wave, a coder circuit comprising a closed loop circuit and terminals for injecting a signal into said loop circuit, said loop circuit including a cathode-ray tube which comprises means for producing an electron beam, beam deflecting plates, a mask, and a collector target beyond said mask, said mask being so apertured that the output produced by an electron beam impinging on said target contributes to a transmission characteristic of said loop circuit such that for each transversal thereof a signal originally appearing at said terminals will reappear thereat with an amptitude equal to double its original amplitude when said original amplitude is less than one-half $a$ and with an amplitude equal to double its original amplitude minus $a$ when said original amplitude is greater than one-half $a$, means for applying each message wave sample to said terminals, means for causing $n$ transversals of said loop circuit for each message wave sample, and means associated with said loop circuit for producing a signal pulse of one of said values for each signal at said terminals of amplitude less than one-half $a$ and for producing a pulse of the other of said values for each signal at said terminals of amplitude greater than one-half $a$, said means for producing a signal pulse comprising at least one electrode which is adapted to produce a signal when impinged upon by a stream of electrons and a multivibrator which is adapted to produce a pulse of the required amplitude and duration when energized by a signal from said electrode.

12. In a system for representing samples of a message wave by permutation code groups of $n$ bivalued pulses, $n$ being any positive integer, covering an amplitude range $a$ in $2^n$ steps, means for sampling the message wave, a coder circuit comprising a closed loop circuit and terminals for injecting a signal into said loop circuit, said loop circuit including a cathode-ray tube which comprises means for producing an electron beam, beam deflecting plates, a mask, and a collector target beyond said mask, said mask being so apertured that the output produced by an electron beam impinging on said target contributes to a transmission characteristic of said loop circuit such that for each transversal thereof of a signal original appearing at said terminals will reappear thereat with an amplitude equal to double its original amplitude when said original amplitude is less than one-half $a$ and with an amplitude equal to double its original amplitude minus $a$ when said original amplitude is greater than one-half $a$, means for applying each message wave sample to said terminals, means for causing $n$ transversals of said loop circuit for each message wave sample, and means associated with said loop circuit for producing a signal pulse of one of said values for each signal at said terminals of amplitude less than one-half $a$ and for producing a pulse of the other of said values for each signal at said terminals of amplitude greater than one-half $a$, said means for producing a signal pulse comprising at least one electrode which is adapted to produce a signal when impinged upon by a stream of electrons and a cathode-follower circuit which is adapted to produce a pulse of the required amplitude and duration when energized by a signal from said electrode.

13. In a system for representing samples of a message wave by permutation code groups of $n$ bivalued pulses, $n$ being any positive integer, covering an amplitude range $a$ in $2^n$ steps, means for sampling the message wave, a coder element having input and output terminals and including a cathode-ray tube which comprises means for producing an electron beam, beam deflecting plates, a mask, and a collector target beyond said mask, said mask being so apertured that the output produced by an electron beam impinging upon said target is adapted to produce an output double the input for all inputs less than one-half $a$ and an output equal to double the input minus $a$ for all inputs greater than one-half $a$ and including means for producing a signal pulse of one of the two values for all inputs less than one-half $a$ and a signal pulse of the other of said two values for all inputs greater than one-half $a$, means for applying the message wave sample to the input terminals of said coder element for the production of the first code element pulse, and means for applying the output of said coder element resulting from the production of each code element pulse to the input of said coder element for the production of the next code element pulse.

14. The invention according to claim 3, said mask having two apertures of substantially triangular shape.

15. The invention according to claim 3, said mask having four apertures of substantially triangular shape.

FRANK GRAY.

REFERENCES CITED

The following references are of record in the file of this patent:

UNITED STATES PATENTS

| Number | Name | Date |
|---|---|---|
| 1,757,345 | Strobel | May 6, 1930 |
| 2,257,795 | Gray | Oct. 7, 1941 |
| 2,458,652 | Sears | Jan. 11, 1949 |